June 7, 1960 A. H. HAROLDSON ET AL 2,939,178
PROCESS FOR MOLDING SINTERED POLYTETRAFLUOROETHYLENE ARTICLES
Filed April 30, 1958
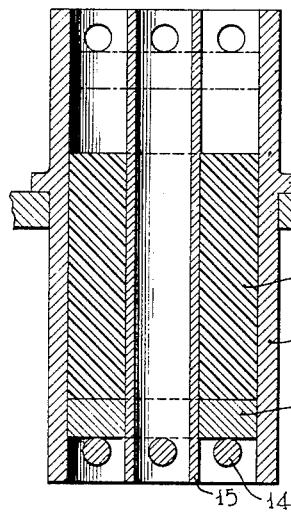
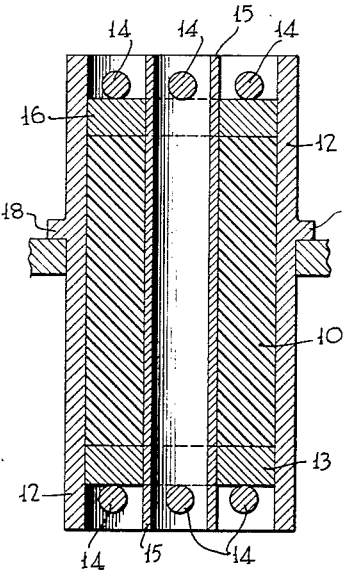
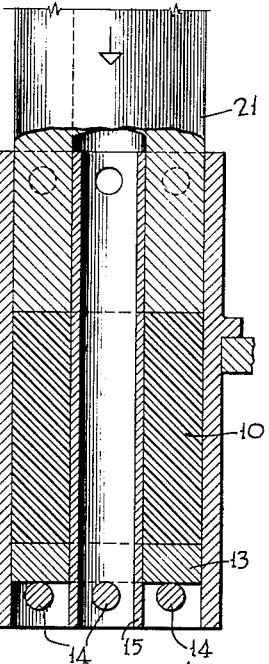
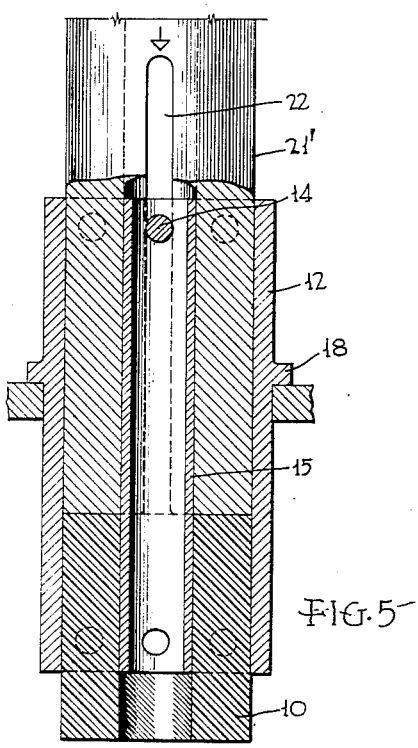
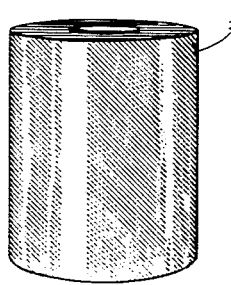
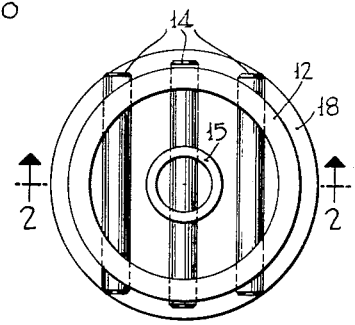
INVENTORS
Arthur H. Haroldson
George H. Watrous
BY
Wm. R. Glisson
ATTORNEY

2,939,178
PROCESS FOR MOLDING SINTERED POLYTETRAFLUOROETHYLENE ARTICLES

Arthur H. Haroldson, Newark, and George H. Watrous, Brookside, Del., assignors to Continental-Diamond Fibre Corp., Newark, Del., a corporation of Delaware Filed Apr. 30, 1958, Ser. No. 731,948

3 Claims. (Cl. 18—55)

This invention relates to a process for molding sintered polytetrafluoroethylene articles such as billets, especially for molding reclaimed material which has previously been sintered, and has for an object the provision of improvements in this art.

One of the particular objects of the invention is to provide a sintered article which is very compact and free from porosity and incipient cracks such as are found in articles which are molded without sufficient pressure.

Another object is to provide sintered articles which are free from the hard leathery condition found in articles which are molded from reclaimed material with excessive pressure during sintering, as by being confined without expansion or with uncontrolled overflow during sintering as provided, for example, by Patent 2,400,094. The process of molding without applied pressure after sintering gives an acceptacle product when starting with virgin material which has never been sintered but will not work at all for reclaimed material. The present process does produce a good product from reclaimed material and also produces a good product from virgin material.

The method comprises the following steps:

(1) A preform is made by cold-pressing finely powdered material at about 2000 lbs. per square inch, more or less. The size of the preform will not vary greatly so that the pressures may range between, say 500 and 3000 p.s.i.

(2) The preform is confined in a mold for limited but not free expansion and sintered. The size for expansion is restricted to provide final pressures of about 400 to 1800 p.s.i. The expansion can be between about 15% and 35%, that shown being about 26%.

(3) The sintered article is compressed as it cools to very considerably reduce its size. The pressure can be about 2000 p.s.i. and will produce a volume reduction of about 15% to 35% (specifically shown as about 25%) from the sintered size or about 5¾% from the original preform size.

After cooling the article is ejected from the mold.

The invention will be described in connection with an exemplary embodiment thereof, reference being made to the accompanying drawings, wherein:

Fig. 1 shows a compressed preform;

Fig. 2 shows the preform in a mold ready for sintering, the view being taken on line 2—2 of Fig. 6;

Fig. 3 shows the same after sintering;

Fig. 4 shows the pressing operation after sintering;

Fig. 5 shows the article being removed from the mold; and

Fig. 6 is a top plan view of Fig. 3.

As shown in Fig. 1, a preform 10 is first formed by cold-pressing powdered material in a mold with a core to form a cylinder with a hollow center. The pressure used can vary because the subsequent mold size can be selected to suit the preform and attain a desired pressure during sintering. Cold-pressing pressures of from 500 to 3000 p.s.i. have been used with good results.

The preform 10 is placed in a cylindrical mold 12 in which a close-fitting bottom plate 13 has been inserted over removable retaining pins 14. A core tube 15 is placed in the center and is also held by a removable pin 14. A close fitting cap 16 is placed above the preform and removable retaining pins 14 put in place. The peripheral edge of the cap 16 is preferably lined with a softer metal to prevent marring the inside surface of the mold 12. The distance allowed for expansion is based on the length and density of the preform and is arranged to cause a final sintering pressure of from 400 to 1800 p.s.i. This, on the one side, avoids the porous body produced when sintering is performed without any pressure, which porosity cannot later be eliminated; and, on the other side, avoids the hard leathery texture which is produced when the article is confined without any permissible expansion during sintering. It is not satisfactory to try to provide for expansion during sintering by an overflow hole because this does not give accurate control and, moreover, is wasteful of material, the overflow material being lost.

The mold is provided with an outer flange 18 by which it can be handled, as by a fork truck, in putting it in the sintering oven, removing it therefrom, placing it in a press during cooling, and removing it therefrom.

After the sintering operation the mold is carried to a press at a cooling zone and the top pins 14 and cap 16 removed. A tubular plunger 21 compresses the billet during cooling. Cooling may be with the mold in air or in a cooling liquid, as may be desired. Pressures of about 2000 p.s.i. may be used.

The pressure during cooling reduces the size of the billet to somewhat less than that of the original preform. For example, a preform having a length of 13" expanded on sintering to 16¾" and was finally compressed while cooling to 12¼".

After cooling, the bottom pins 14 and the bottom plate 13 are removed, the top center pin 14 being left in to hold the tube 15, and a plunger 21', with the slots 22 straddling the pin 14 by further movement pushes the billet out of the mold.

The billet may now be put on a turning arbor and skived in the usual way to form sheet material. The material is not leathery, as when over-pressed during sintering, and is not porous or cracked, as when under-pressed during sintering, so can be skived to give sound continuous sheet material.

The product produced by the above process has superior dielectric strength properties to a product produced by the conventional method (heating without pressure). This is exemplified by the test that 3 mil tape skived from the Teflon billet made in the confined mold has about one-half the number of pinholes as the tape skived from a billet made by the conventional method. The pinhole count is determined by passing 10 or more feet of tape through ¼" electrodes at a potential of 1500 volts. Dielectric breakdown is regarded as failure or the presence of a pinhole.

It is thus seen that the invention provides an improved molding process for polytetrafluoroethylene, especially for reclaimed material, and also provides a superior product.

While one embodiment of the invention has been described for purposes of illustration, it is to be understood that there may be various embodiments and modifications within the general scope of the invention.

What is claimed is:

1. The method of molding polytetrafluoroethylene to produce sound articles free from porosity and cracks and free from hard leathery texture even when reclaimed material is used, which comprises, cold-pressing powdered reclaimed polytetrafluoroethylene material under pressure of 500 to 3000 p.s.i. to make a dense coherent preform, confining the preform in an oversized but completely enclosed mold of a size to allow limited expansion of 15% to 35% and thereafter to create high pressure of 400 to 1800 p.s.i. in the material under complete confinement without escape of material, sintering the preform in the mold with concurrent expansion of the material but without escape of material until the desired pressure is created, and subsequently cooling the sintered preform in a mold with a continuously applied follow-up pressure sufficient to materially reduce the size of the body of material in the mold until the material is cool and dense.

2. The method as set forth in claim 1, wherein the decrease in volume during cooling is at least as much as the previous expansion so that the resultant article is at least as small as the original preform.

3. The method as set forth in claim 1, wherein the subsequent pressure during cooling is about 2000 p.s.i. with a reduction in volume in the material which is at least as much as the previous expansion during sintering.

References Cited in the file of this patent

UNITED STATES PATENTS

| | | |
|---|---|---|
| 2,400,094 | Benning et al. | May 14, 1946 |
| 2,456,262 | Fields | Dec. 14, 1948 |